United States Patent
Brouwer et al.

(10) Patent No.: US 9,657,874 B2
(45) Date of Patent: May 23, 2017

(54) PLUMBING FITTING ADAPTER

(71) Applicant: Kohler Co., Kohler, WI (US)

(72) Inventors: Douglas J. Brouwer, Sheboygan, WI (US); Michael W. Smith, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 14/696,040

(22) Filed: Apr. 24, 2015

(65) Prior Publication Data
US 2015/0308593 A1    Oct. 29, 2015

Related U.S. Application Data

(60) Provisional application No. 61/984,454, filed on Apr. 25, 2014.

(51) Int. Cl.
*F16L 19/04* (2006.01)
*F16L 19/02* (2006.01)

(52) U.S. Cl.
CPC ......... *F16L 19/048* (2013.01); *F16L 19/0206* (2013.01)

(58) Field of Classification Search
CPC .................................................. F16L 37/088
USPC .......................................... 285/58; 251/148
See application file for complete search history.

(56) References Cited

U.S. PATENT DOCUMENTS

| | | | |
|---|---|---|---|
| 572,911 A * | 12/1896 | Shmidt | F16L 5/00 137/359 |
| 738,503 A | 9/1903 | Waters | |
| 1,460,986 A * | 7/1923 | Smith | F16L 13/11 285/179 |
| 1,579,503 A * | 4/1926 | Bloch | F16K 11/044 137/625.5 |

(Continued)

FOREIGN PATENT DOCUMENTS

| EP | 736715 | 10/1996 |
|---|---|---|
| EP | 1036973 | 9/2000 |

(Continued)

OTHER PUBLICATIONS

PCT Search Report dated Feb. 25, 2010 in corresponding application PCT/US2009/005827 (7 pages).

(Continued)

*Primary Examiner* — Craig Schneider
*Assistant Examiner* — Angelisa L Hicks
(74) *Attorney, Agent, or Firm* — Foley & Lardner LLP

(57) ABSTRACT

A coupling system for interconnecting a tube to a valve body is provided. The valve body has a body portion and a nipple extending from the body portion, and the nipple has a threaded external surface and an internal wall defining a bore. The coupling system further includes an adapter having opposing first and second ends, a nut defining a hole through which the first end passes, and a compression fitting located between the nipple, the adapter, and the nut such that when the nut is tightened onto the nipple, the compression fitting inhibits removal of the adapter from the valve body.

(Continued)

The adapter defines a passageway extending from the first end to the second end, wherein the first end is received in the bore and the second end is configured to couple to the tube. The nut has an internally threaded surface configured to engage the threaded external surface.

20 Claims, 6 Drawing Sheets

(56) References Cited

U.S. PATENT DOCUMENTS

| | | | |
|---|---|---|---|
| 2,344,032 A | 3/1944 | Eden | |
| 2,468,315 A | 4/1949 | Wagner | |
| 3,201,153 A | 8/1965 | Currie | |
| 3,659,881 A | 5/1972 | Tinsley et al. | |
| 4,139,221 A | 2/1979 | Shotbolt | |
| 4,478,438 A | 10/1984 | Elorriaga, Jr. | |
| 4,484,600 A | 11/1984 | Peterson et al. | |
| 4,516,796 A * | 5/1985 | Hudson | F16L 27/0812 285/347 |
| 4,592,388 A | 6/1986 | Wilcox | |
| 4,997,008 A | 3/1991 | Zbin | |
| 5,025,510 A | 6/1991 | Basile | |
| 5,402,822 A * | 4/1995 | Brouwer | F16K 11/0445 137/526 |
| 5,718,464 A | 2/1998 | Mark | |
| 5,758,690 A | 6/1998 | Humpert et al. | |
| 5,873,387 A | 2/1999 | Weber et al. | |
| 5,934,325 A | 8/1999 | Brattoli et al. | |
| 6,183,636 B1 | 2/2001 | Bowers et al. | |
| 6,220,278 B1 | 4/2001 | Sauter et al. | |
| 6,220,297 B1 | 4/2001 | Marty et al. | |
| 6,381,770 B1 | 5/2002 | Raisch | |
| 6,471,141 B2 | 10/2002 | Smith et al. | |
| 6,530,606 B2 | 3/2003 | Lehner | |
| 6,547,159 B1 * | 4/2003 | Westby | B05B 15/06 239/204 |
| 6,746,055 B1 | 6/2004 | Wood et al. | |
| 6,807,983 B1 | 10/2004 | Erickson | |
| 7,055,545 B2 | 6/2006 | Mascari et al. | |
| D533,622 S | 12/2006 | Ross et al. | |
| 7,686,352 B2 | 3/2010 | Preston | |
| 8,186,375 B2 | 5/2012 | Andersen et al. | |
| 8,863,769 B2 | 10/2014 | Andersen et al. | |
| 2002/0140221 A1 * | 10/2002 | Cooper | F16L 37/088 285/33 |
| 2003/0084937 A1 | 5/2003 | Burns et al. | |
| 2003/0197378 A1 | 10/2003 | Allstead et al. | |
| 2004/0010848 A1 | 1/2004 | Esche | |
| 2004/0056484 A1 * | 3/2004 | Kwon | F16L 37/088 285/321 |
| 2005/0127664 A1 * | 6/2005 | Arth | B29C 65/02 285/21.1 |
| 2007/0052237 A1 * | 3/2007 | Udhofer | F16L 19/0231 285/387 |
| 2008/0012326 A1 * | 1/2008 | Braathen | F16L 19/0231 285/354 |
| 2009/0199382 A1 | 8/2009 | Heaton | |
| 2009/0230678 A1 | 9/2009 | Krohn | |
| 2010/0019484 A1 | 1/2010 | Krohn | |

FOREIGN PATENT DOCUMENTS

| | | |
|---|---|---|
| EP | 898109 | 5/2003 |
| WO | WO 2008/136959 | 11/2008 |
| WO | WO 2010/001719 | 1/2010 |

OTHER PUBLICATIONS

International Search Report for PCT/US2010/020970 dated Apr. 29, 2010 (4 pages).

* cited by examiner

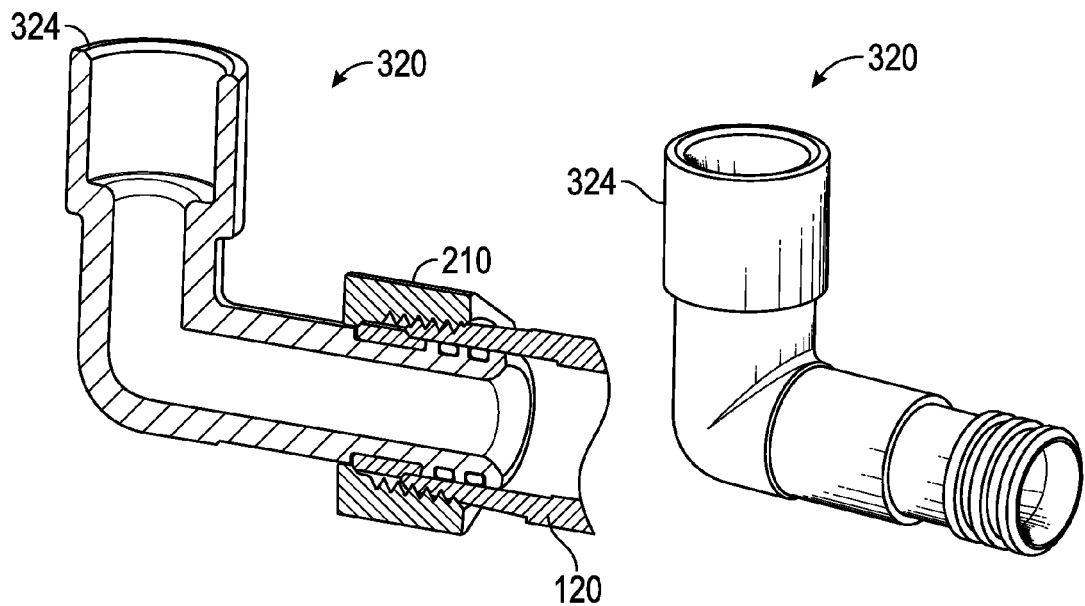
FIG. 7    FIG. 8
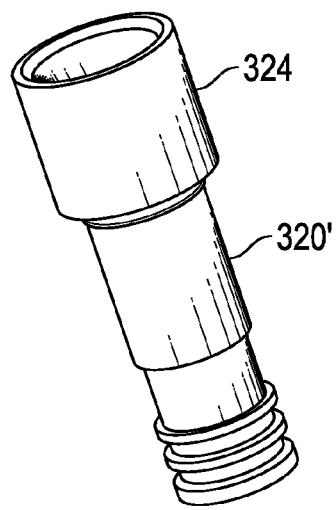
FIG. 9

PLUMBING FITTING ADAPTER

CROSS-REFERENCE TO RELATED PATENT APPLICATIONS

This application claims the benefit of and priority to U.S. Provisional Patent Application No. 61/984,454, which was filed on Apr. 25, 2014. U.S. Provisional Patent Application No. 61/984,454 is incorporated by reference herein in its entirety.

BACKGROUND

The present application relates generally to the field of plumbing. The present application relates more specifically to apparatus for connecting a fitting to a threaded nipple.

New materials (e.g., cross-linked polyethylene (PEX), polyvinyl chloride (PVC), and chlorinated polyvinyl chloride (CPVC)) are becoming more commonly used in the plumbing of commercial and residential buildings. Joining pipes and tubes made of these new materials to traditional metal pipes and valve bodies, while routing through confined spaces between studs, can be difficult. Thus, there is a need for an improved plumbing fitting.

SUMMARY

One embodiment relates to a coupling system for interconnecting a tube to a valve body. The valve body has a body portion and a nipple extending from the body portion, and the nipple has a threaded external surface and an internal wall defining a bore. The coupling system further includes an adapter having a first end and a second end opposite the first end, a nut defining a hole through which the first end of the adapter passes, and a compression fitting. The compression fitting is located between the nipple, the adapter, and the nut, such that when the nut is tightened onto the nipple, the compression fitting inhibits removal of the adapter from the valve body. The adapter defines a passageway extending from the first end to the second end, wherein the first end of the adapter is received in the bore of the nipple and the second end of the adapter is configured to couple to the tube. The nut has an internally threaded surface configured to engage the threaded external surface of the nipple.

Another embodiment relates to an adapter kit for fluidly coupling a tube to a threaded nipple. The adapter kit includes a nut defining a hole therethrough and configured to engage the threaded nipple and an adapter body extending through the hole in the nut. The adapter body includes: a first end configured to be received in the nipple, a second end opposite the first end and configured to couple to the tube, a passageway extending within the adapter body from the first end to the second end, and an outer surface.

Another embodiment relates to an adapter for interconnecting a tube formed of cross-linked polyethylene or chlorinated polyvinyl chloride to a threaded nipple on a valve body using a nut and a compression fitting. The adapter includes an adapter body having: a first end configured to be received in the nipple, a second end opposite the first end and configured to couple to the tube, a passageway extending within the adapter body from the first end to the second end, and an outer surface having a recess configured to receive the compression fitting and having a groove between the recess and the first end configured to receive an O-ring.

The foregoing is a summary of several embodiments and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

BRIEF DESCRIPTION OF THE DRAWINGS

FIG. 7 is a section view of a portion of a valve body and an adapter kit, according to an exemplary embodiment, as seen through line II-II in FIG. 1.

FIG. 8 is a perspective view of another exemplary embodiment of an adapter for use with the valve body and adapter kit of FIG. 7.

FIG. 9 is a perspective view of yet another exemplary embodiment of an adapter.

DETAILED DESCRIPTION

Referring generally to the FIGURES, a valve body, adapter kit, and components thereof, are shown according to various exemplary embodiments that may be used with, for example, showerheads, baths, faucets, and other water delivery devices. The valve body 100 includes a fluid control valve (not shown) configured to control the flow of water through the valve body. The exemplary valve body shown has a universal National Pipe Thread (NPT)/sweat style standard nipples for connecting conduits (e.g., pipes, tubes, lines, etc.) carrying hot and cold water to the valve body and carrying mixed water from the valve body, for example, to a showerhead or a bath spout. The NPT/sweat style fitting allows a plumber to couple female NPT fittings to the threads on the nipple, or to sweat (e.g., solder) a tube into the bore, without needing a different valve body for each of the NPT or sweating applications. An adapter kit 200, including an adapter 220 (e.g., fitting, etc.), may couple to the nipples on the valve body 100. The adapter 220 may facilitate coupling tubing of a dissimilar material than the valve body to the valve body and may include one or more bends that may facilitate routing of the conduits to the valve body.

Before discussing further details of the valve body, adapter kit, and/or the components thereof, it should be noted that references to "front," "back," "rear," "up," "down," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
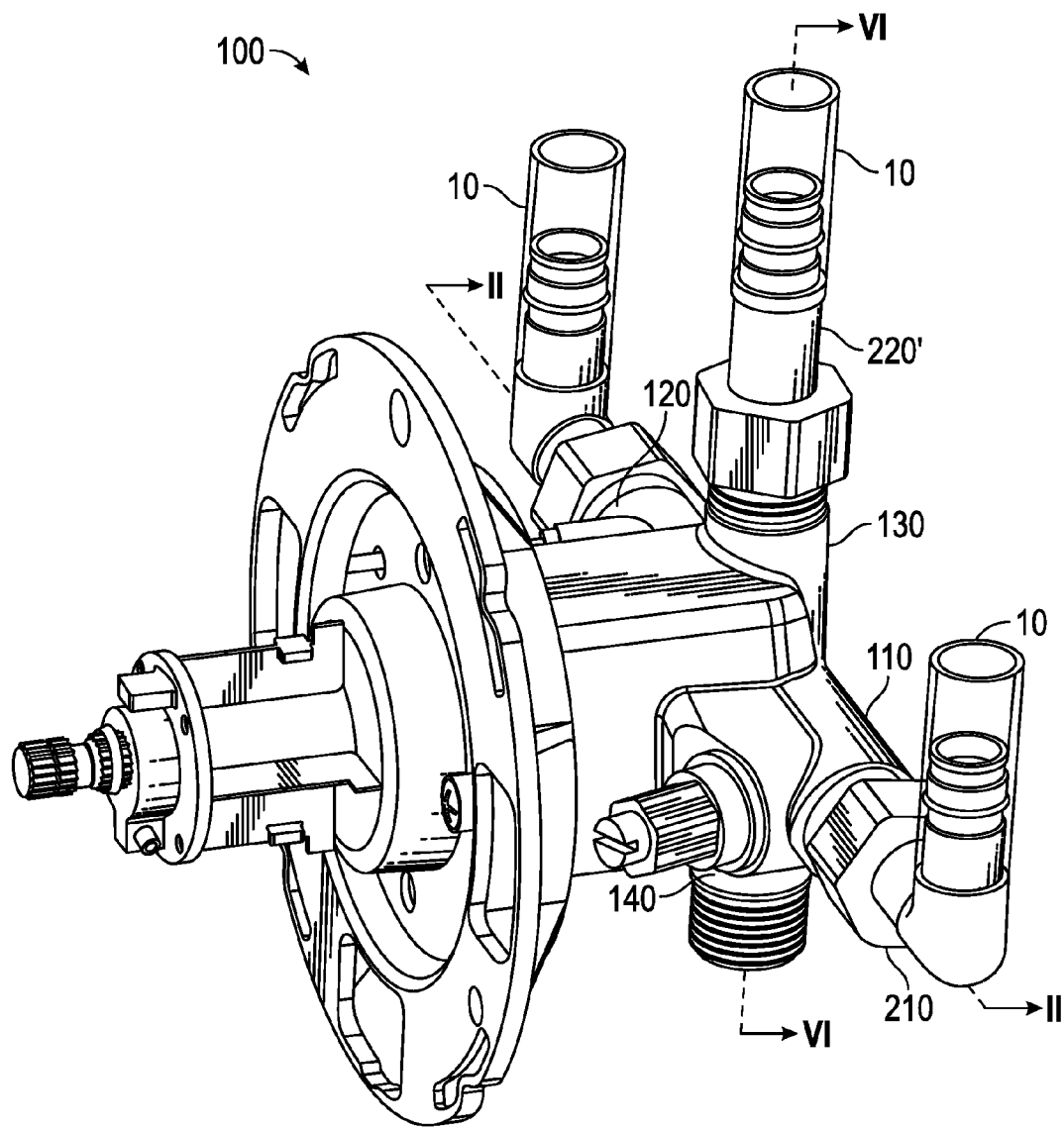
FIG. 1 is a perspective view of an exemplary embodiment of a valve body and an adapter kit.

FIG. 1 illustrates the valve body 100 having a plurality of nipples with an adapter associated with each nipple. The valve body 100 may include a fluid control valve (not shown) for the control of a fluid to a plumbing fixture (not shown), for example, a showerhead, a bath spout, a ceiling panel, spray tile, etc. The fluid control valve may be any suitable valve, for example, a sequential valve, concentric valve, etc. As shown, the fluid control valve is a mixing valve that mixes hot and cold water and provides the mixed water at as desired temperature to one or more outlets. The valve body 100 and mixing valve therein are an exemplary valve body and exemplary fluid control valve used to facilitate description of the adapter 220 and the adapter kit 200. However, it should be understood that the adapter 220 and the adapter kit 200, described herein, may be used with any suitable valve body or flow control valve.

The valve body 100 includes a first inlet body portion 110 (e.g., cold inlet portion, body portion, etc.) shown to extend substantially horizontally to the right from the valve body 100 in FIG. 1. The valve body 100 further includes a second inlet body portion 120 (e.g., hot inlet portion, body portion, etc.), shown to extend substantially horizontally to the left from the valve body 100. The valve body 100 may include a first outlet portion 130 shown to extend substantially vertically upward from the valve body 100. According to an exemplary embodiment, the first outlet portion 130 may be connected to an upper water outlet (e.g., showerhead, ceiling panel, etc.). The valve body 100 further includes a second outlet portion 140 shown to extend substantially vertically downward from the valve body 100. According to an exemplary embodiment, the second outlet portion 140 may be connected to a lower water outlet (e.g., a bath spout, etc.). It should be understood that, while the first and second inlet body portions 110, 120 are associated with cold and hot water respectively, the association may be reversed. For example, in plumbing back-to-back showers, plumbing cold water or hot water to the same side of both of the valve bodies facilitates installation.

During installation, the valve body 100 is mounted between in a wall cavity between two studs, which, in the United States, are nominally spaced 14.5 inches apart (16 inches on center). Supplies of hot and cold water are typically piped down from the top of the wall cavity or piped up from the bottom of the wall cavity. Water may be supplied to the valve body 100 through conduits 10 (e.g., tubes, pipes, lines, etc.) made of any suitable material (e.g., copper, iron, polyvinyl chloride (PVC), chlorinated polyvinyl chloride (CPVC), cross-linked polyethylene (PEX)). In a typical PEX installation, PEX tubing having a nominal diameter of one-half inch has a bend radius of approximately 5 inches. Accordingly, in a conventional PEX tubing installation, an installer must cut holes in the studs to allow the PEX tubing to pass through the stud into the adjacent wall cavity, or install 90° adapters and add additional joints in the plumbing system, both of which make installation more difficult.

Figure 2:
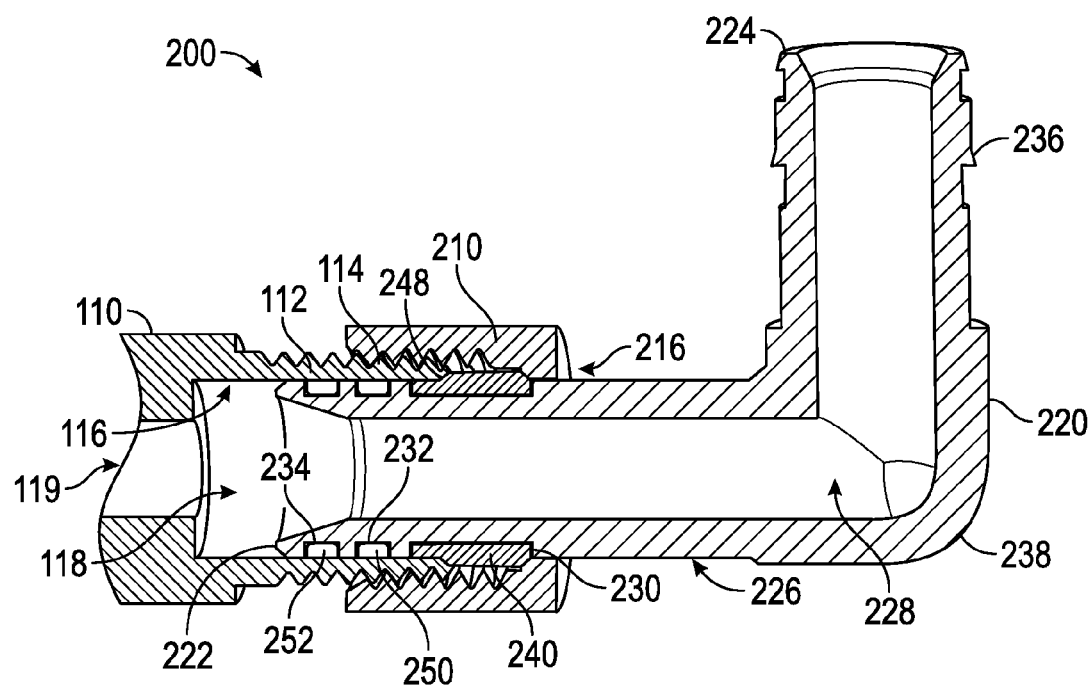
FIG. 2 is a section view of a portion of the valve body and the adapter kit of FIG. 1 taken through line II-II in FIG. 1.

FIG. 2 illustrates a portion of the first inlet body portion 110 and adapter kit 200, according to an exemplary embodiment. The first inlet body portion 110 of the valve body 100 is shown to include a nipple 112 extending from the valve body 100. An external surface of the nipple 112 has threads 114, which, according to an exemplary embodiment, are a standard screw thread type (e.g., National Pipe Thread (NPT), British Standard Pipe (BSP), etc.). A surface 116 of an internal wall of the nipple 112 defines a bore 118 (e.g., sweat bore). As shown, the surface 116 is a substantially smooth surface (e.g., being devoid of threads, recesses, grooves, projections, etc.). A channel 119 (e.g., bore, hole, aperture, passage, etc.) at least partially fluidly couples the bore 118 to the fluid control valve in the valve body 100. According to the exemplary embodiment shown, the nipple 112 is configured such that a pipe may be threadably connected to the nipple 112 (e.g., using a nut 210) or the pipe may be inserted into the bore 118 and soldered (i.e., sweated) thereto.

Figure 6:
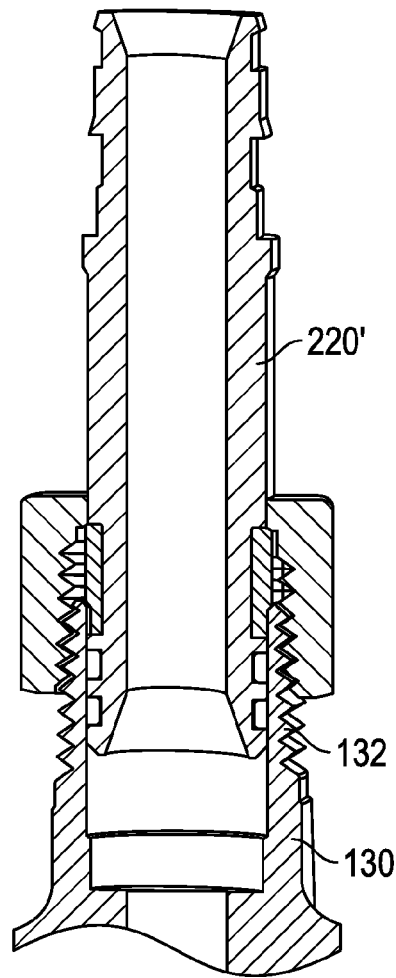
FIG. 6 is a perspective view a portion of the valve body and an adapter kit, shown according to another exemplary embodiment, through line VI-VI in FIG. 1.

According to the exemplary valve body 100 shown, the second inlet body portion 120 (shown in FIG. 1) includes a nipple substantially similar to that shown and described with respect to the first inlet body portion 110. Further, each of the first outlet portion 130 (see nipple 132 in FIG. 6) and the second outlet portion 140 (see FIG. 1) is shown to include a nipple substantially similar to that shown described with respect to the first inlet body portion 110.

Figure 4:
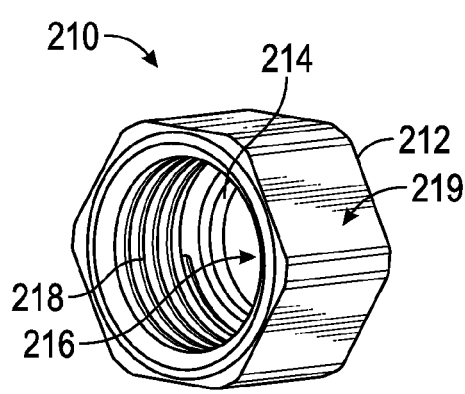
FIG. 4 is a perspective view of an exemplary embodiment of a nut of FIG. 1 for use with a valve body and adapter kit, such as the valve body and adapter kit of FIG. 1.
Figure 5:
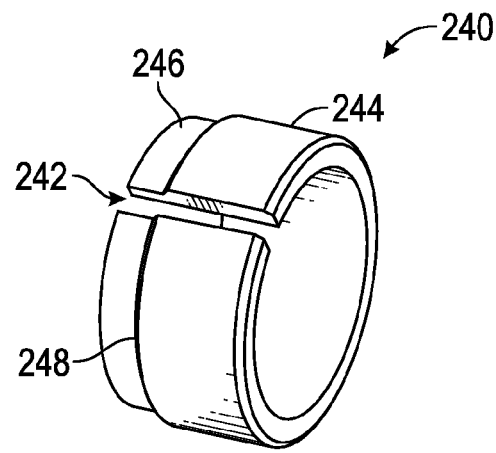
FIG. 5 is a perspective view of an exemplary embodiment of a compression fitting for use with a valve body and adapter kit, such as the valve body and adapter kit of FIG. 1.

FIG. 4 illustrates an exemplary embodiment of a nut 210 that includes an axially extending body 212 (e.g., a body extending in a longitudinal direction of the nut). The first end of the nut has an inward extending flange 214 that defines a hole 216 through which the adapter 220 is configured to pass. An inner surface of the nut 210 includes threads 218 configured to engage the threads (e.g., threads 114) on the nipple (e.g., nipple 112). The flange 214 may extend radially inward beyond the threads to define an innermost diameter of the nut 210. This arrangement of the flange and nut may advantageously engage and/or retain a compression fitting when the adapter kit 200 is assembled. The external surface 219 of the nut 210 may have any suitable shape. According the exemplary embodiment shown, the external surface 219 has a hexagonal shape to facilitate assembly using a wrench.

Figure 3:
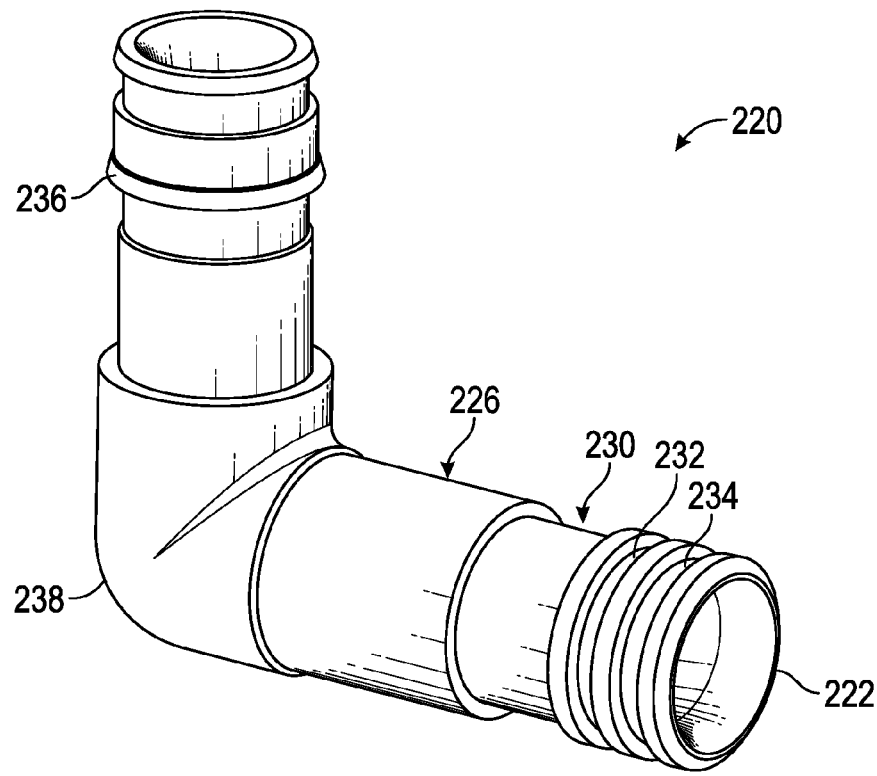
FIG. 3 is a perspective view of an exemplary embodiment of an adapter for use with a valve body and adapter kit, such as the valve body and adapter kit of FIG. 1.

As shown in FIGS. 2 and 3, the adapter kit 200 further includes an adapter 220 having a first end 222, a second end 224 opposite the first end 222, and an outer (e.g., exterior) surface 226. A passageway 228 extends within the adapter 220 from the first end 222 to the second end 224. The adapter 220 may be formed of any suitable material, for example, a metal (e.g., copper, brass, etc.), a plastic (e.g., polyvinyl chloride (PVC), chlorinated polyvinyl chloride (CPVC), etc.), a composite, etc. According to the exemplary embodiment shown, the adapter 220 is a unitary, rigid piece formed by an injection molding process.

The first end 222 of the adapter 200 is configured to be received in the bore 118 of the nipple 112. The diameter of the first end 222 may be less than the diameter of the bore 118, which may provide for a sliding fit between the first end 222 and the bore 118 wall. The outer surface 226 may define a recess 230 (e.g., channel) extending circumferentially around the adapter 220, such as for a compression fitting 240 (e.g., compression sleeve, compression member, etc.) to be seated therein. As shown in FIG. 2, the recess 230 in the outer surface 226 is annular having a substantially U-shaped cross-section. Thus, the recess 230 cuts radially inward into the outer surface 226 of the adapter 220. The outer surface 226 may define a first groove 232 extending circumferentially around the adapter 220 and having a sealing member, shown as O-ring 250, seated therein. According to some embodiments, the outer surface 226 may further define a second groove 234 extending circumferentially around the adapter 220 and having a second sealing member (e.g., an O-ring 252) seated therein. According to some embodiments, at least one of the first groove 232 and the second groove 234 are located between the recess 230 and the first end 222, which may advantageously help seal the connection between the adapter 220 and the nipple 112. As shown, the first groove 232 and the second groove 234 are located between the recess 230 and the first end 222. Each groove 232, 234 may be annular with a U-shaped cross-section. Thus, each groove 232, 234 cuts radially inward into the outer surface 226 of the adapter 220.

The second end 224 of the adapter 220 is configured to couple to the tube 10 supplying water to or carrying water away from the valve body 100. For example, the second end 224 may include one or more structures 236 (e.g., ribs, barbs, etc.) configured to facilitate coupling of the tube 10 to the adapter 220. As shown in FIG. 2, the structure 236 is a rib having a triangular shape that extends outwardly from an adjacent outer surface on the second end 224. An annular recess (e.g., having a C-shaped cross-section) may be disposed between the rib and the bend of the adapter 220. According to an exemplary embodiment, the structure 236 facilitates crimping of a tube 10 formed of PEX to the adapter 220, such as by crimping a portion of the tube 10 into the recess while the rib engages an inner surface of the tube. Referring briefly to FIGS. 7-9, adapters 320, 320' are shown to include second end 324 formed as a female socket, which may be configured to receive a tube 10 formed of CPVC, in which case, the adapter 320, 320' may be formed of CPVC. According to various other embodiments, the adapter 220, 220', 320, 320' may be configured to couple to tubes formed out of various other materials, e.g., high density polyethylene (HDPE), acrylonitrile butadiene styrene (ABS), etc.

As shown in FIG. 2, the passageway 228 extends in a first (e.g., horizontal) direction at the first end 222 of the adapter 220, and the passageway 228 extends in a second (e.g., vertical) direction at the second end 224 of the adapter 220. The first direction and the second direction may be in different directions or in the same direction (e.g., a straight passageway). The adapter 220 is shown to include at least one bend 238 (e.g., turn, angle, etc.). For example, the bend 238 may be at least 45 degrees. According the exemplary embodiment shown, the bend 238 is substantially 90 degrees and the first direction and the second direction are substantially perpendicular. Having a bend 238 in the adapter 220 advantageously enables the tubes 10 to be run in the same wall cavity as the valve body 100, thereby facilitating installation. According to another embodiment, the first direction and the second direction may be parallel. According to the embodiment shown in FIG. 6, the adapter 220' is substantially straight, and the first direction and the second direction are collinear. The adapter 220' may be used, for example, with the first outlet portion 130 and with the second outlet portion 140, which are already aligned with the wall cavity, or when connecting a threaded pipe to PEX, PVC, CPVC, etc., tubing.

Also shown in FIG. 2, the adapter 220 passes through the opening 216 in the nut 210. Having the adapter 220 pass through the nut 210 enables a bend (e.g., bend 238) in the adapter 220 to help retain the nut 210, facilitates reorientation (e.g., up, down, etc.) of the adapter 220 relative to the valve body 100, and prevents wear on flexible hose that may occur if the hose moves during pressure spikes in the fluid.

Figure 10:
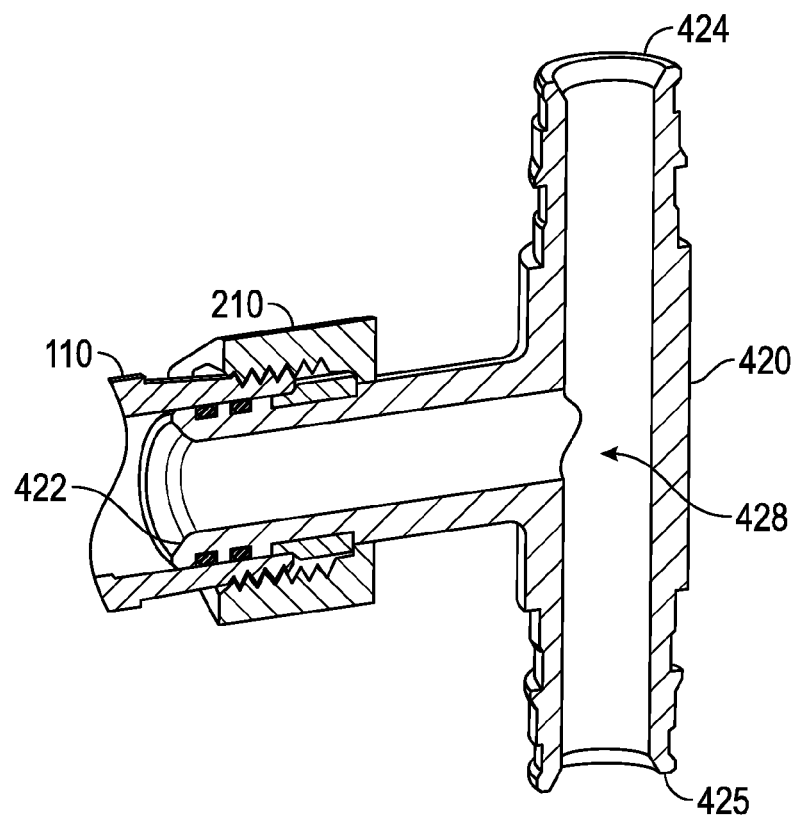
FIG. 10 is a section view of a portion of another exemplary embodiment of a valve body and an adapter kit, as seen through line X-X in FIG. 11.
Figure 11:
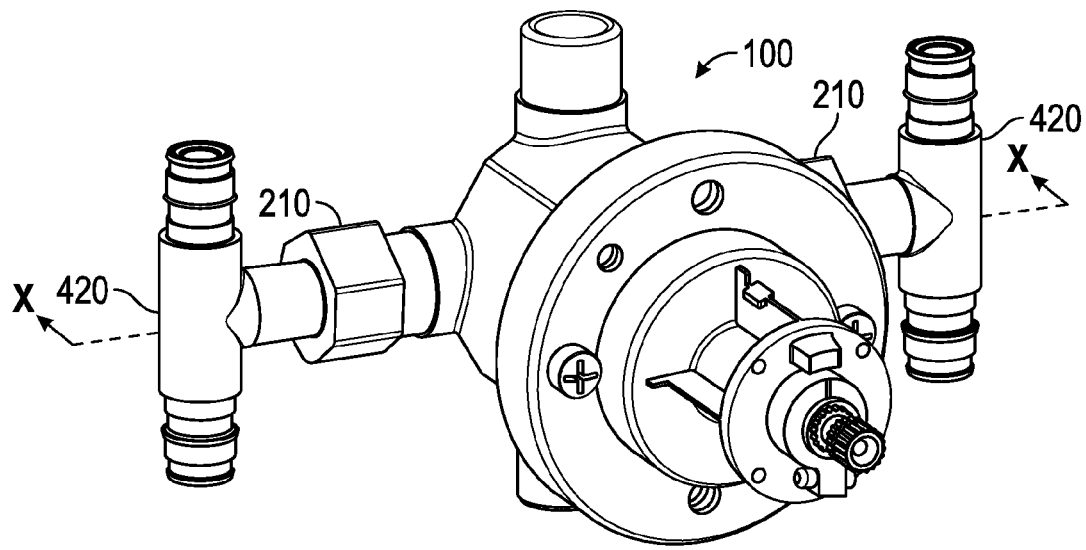
FIG. 11 is a perspective view of another exemplary embodiment of a valve body and the adapter kit.
Figure 12:
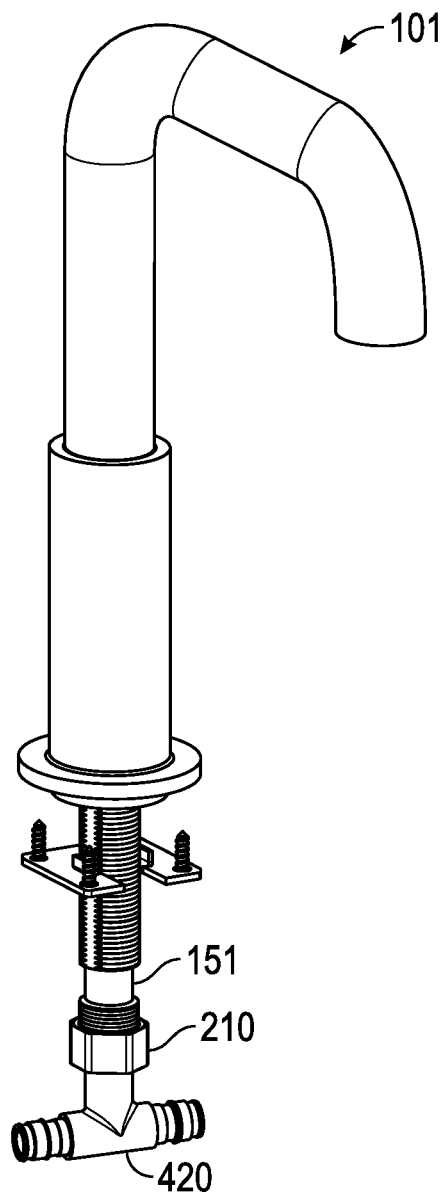
FIG. 12 is a perspective view of an exemplary embodiment of a spout and the adapter kit of FIG. 10.

FIGS. 10-12 illustrate another exemplary embodiment of an adapter 420 configured as a "tee" fitting having a passageway 428 extending between a first end 422, a second end 424, and a third end 425. The "tee" of the adapter 420 facilitates additional plumbing layouts. For example, referring to FIG. 11, the adapter 420 may be coupled to the inlets of a valve body 100 so that water may be provided in parallel to the valve body 100 and to another shower or lavatory valve body, which may be stacked on a floor above or below the valve body 100. Referring to FIG. 12, for example, the adapter 420 may be coupled to an end 151 of a faucet or spout 101 for use with a sink. As discussed above with respect to the adapters 220, 320, the adapters 420 may be formed of various suitable materials, and the second end 424 and third end 425 may be shaped to receive tubes 10 formed of PEX, CPVC, or other materials. According to one embodiment, one of the second end 424 and third end 425 may include one or more structures (e.g., ribs, barbs, etc.) configured to facilitate coupling of the tube 10 (e.g., formed of PEX) to the adapter 420, and the other of the second end 424 and third end 425 may be formed as a female socket to receive a tube (e.g., formed of CPVC).

Assembly and installation of the adapter kit 200 will now be described according to an exemplary embodiment. To facilitate understanding of the reader, the installation is described with reference to adapter 220; however, it should be understood that the description below may also apply to the other adapters (e.g., the adapter 320, the adapter 420) of this application. The first end 222 of the adapter 220 is passed through the opening 216 of the nut 210. The compression fitting 240 is seated in the recess 230 on the adapter 220. The compression fitting 240 may have a longitudinal slit 242 (e.g., split, slot, gap, etc.) extending through the sidewall of the compression fitting 240 such that the compression fitting 240 has a substantially "C" shape. The slit 242 facilitates mounting of the compression fitting 240 onto the adapter 220. According to the embodiment shown, the outer surface of the compression fitting 240 has a first or raised portion 244, which is raised relative to a second portion 246. In other words, the first portion 244 extends radially outward beyond the second portion 246, such that the first portion 244 has an outer diameter that is larger than an outer diameter of the second portion 246. The first portion 244 and the second portion 246 may be separated by a shoulder 248 (e.g., ledge, lip, etc.). Thus, the shoulder 248 may extend between the first and second portions 244, 246, such as at an oblique angle relative to the outer surfaces of the first and second portions 244, 246. The shoulder 248 may advantageously be configured to engage a complementary feature, such as a countersunk surface on the end of the nipple 112, to retain the adapter 220 and the compression fitting 240 in place relative to the nipple 112 and the nut 210 when assembled.

When the compression fitting 240 is installed into the recess 230, the second portion 246 is substantially flush with the outer surface 226 of the adapter, and the first portion 244 stands proud of the outer surface 226 of the adapter 220

(e.g., extends radially outward beyond the outer surface 226). The second portion 246 of the compression fitting 240 may be positioned within a cavity defined by the adapter 220 (e.g., the recess 230), the nut 210 (e.g., the flange 214, the internal threads), and the nipple 112 (e.g., an end thereof, such as the countersink). According to the embodiment shown, the inwardly extending flange 214 of the nut 210 is then trapped between the raised first portion 244 and the bend 238. Thus, the nut 210 may be retained to the adapter 220, thereby preventing accidental dropping of the nut 210 into the wall cavity during installation. If provided, the first O-ring 250 may be seated in the first groove 232, and the second O-ring 252 may be seated and the second groove 234. It is contemplated that some embodiments may have only a single groove 232 and single O-ring 250, or may not include any O-rings/grooves. Other embodiments may have a plurality of grooves and O-rings.

The adapter kit 200 may be joined to the valve body 100. The first end 222 of the adapter 220 is inserted into the bore 118. At least one of the first and second O-rings 250, 252 sealingly engage between the adapter 220 and the inner surface 116 of the bore 118. The threads 218 of the nut 210 are then engaged with the threads 114 of the nipple 112. According to the exemplary embodiment shown, the compression fitting 240 is located between the nipple 112, the nut 210, and the adapter 220; the second portion 246 of the compression fitting 240 enters the bore 118; and the end of the nipple 112 abuts the shoulder 248. As the nut 210 is tightened onto the nipple 112, the compression fitting 240 is compressed, and removal of the adapter 220 from the valve body 100 is inhibited. Continued tightening of the nut 210 onto the nipple 112 continues to compress the compression fitting 240; however, this continued tightening of the nut 210 does not increase the compression of the O-rings 250, 252. Therefore, one or both of the O-rings 250, 252 will maintain a seal between the adapter 220 and the nipple 112 even if the nut 210 is over tightened such that the compression fitting 240 fails as a seal. Accordingly, according to some embodiments, the compression fitting 240 is configured to act solely to retain the adapter 220 axially relative to the nipple 112 and not to act as a seal between the adapter 220 and the valve body 100. Accordingly to the exemplary embodiment shown, both the bore 118 and the threads 114 are used to couple the adapter 220 to the valve body 100.

The construction and arrangement of the elements of the valve body and adapter kit as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A coupling system for interconnecting a tube to a valve body, comprising:
    a valve body having a body portion and a nipple extending from the body portion, the nipple having a threaded external surface and an internal wall defining a bore;
    an elongated adapter having a first end and a second end opposite the first end, the adapter defining a passageway extending from the first end to the second end, wherein the first end of the adapter is received in the bore of the nipple, the second end of the adapter is configured to couple to the tube, and the adapter includes a recess that extends inwardly from an outer surface of the first end;
    a nut defining a hole through which the first end of the adapter passes, the nut having an internally threaded surface configured to engage the threaded external surface of the nipple; and
    a compression fitting seated in the recess and having a first portion and a second portion, wherein the first portion contacts the adapter and the nut, the second portion does not extend beyond the outer surface and contacts the adapter, and the compression fitting inhibits removal of the adapter from the valve body with the nut tightened on the nipple.

2. The coupling system of claim 1, wherein the passageway extends in a first direction at the first end of the adapter and extends in a second direction at the second end of the adapter, and wherein the adapter comprises at least one bend between the first end and the second such that the second direction is substantially perpendicular to the first direction.

3. The coupling system of claim 1, wherein an outer surface of the first portion of the compression fitting extends radially outward beyond an outer surface of the second portion of the compression fitting, and wherein the outer surface of the second portion is cylindrical and flush with the outer surface of the first end of the adapter.

4. The coupling system of claim 3, further comprising a first O-ring seated in a first groove extending around the outer surface of the first end of the adapter, wherein the first groove is located between the recess and the first end of the adapter.

5. The coupling system of claim 4, wherein the first O-ring sealingly engages between the adapter and the internal wall of the nipple of the valve body.

6. The coupling system of claim 4, further comprising a second O-ring seated in a second groove extending around the outer surface of the first end of the adapter, wherein the second groove is located between the first groove and the first end of the adapter.

7. The coupling system of claim 3, wherein the compression fitting includes a shoulder separating the first portion and the second portion of the compression fitting, the shoulder extending at an oblique angle relative to each of the outer surface of the first portion and the cylindrical outer surface of the second portion.

8. The coupling system of claim 1, further comprising an O-ring located between the compression fitting and the first end of the adapter;
wherein continued tightening of the nut onto the nipple continues to compress the compression fitting but does not continue to compress the O-ring.

9. The coupling system of claim 1, wherein the second end of the adapter includes at least one of a rib and a recess configured for the tube to be crimped thereto.

10. An adapter kit for fluidly coupling a tube to a threaded nipple, the adapter kit comprising:
a nut defining a hole therethrough and configured to engage the threaded nipple;
an adapter body extending through the hole in the nut and having:
a first end configured to be received in the nipple and having an outer surface configured to support the threaded nipple and the nut, the first end having an annular recess extending radially inwardly from the outer surface;
a second end opposite the first end and configured to couple to the tube; and
a passageway extending within the adapter body from the first end to the second end; and
a compression sleeve having a first portion located between the adapter, the threaded nipple and the nut and a second portion located completely within the recess between the threaded nipple and the adapter.

11. The adapter kit of claim 10, wherein the first portion of the compression sleeve contacts the threaded nipple and the nut; wherein the adapter body comprises a bend between the recess and the second end; and wherein the hole of the nut is defined by an internally extending flange that is trapped between the compression fitting and the bend in the adapter body.

12. The adapter kit of claim 11, wherein the bend is greater than forty-five degrees.

13. The adapter kit of claim 10, wherein the outer surface of the adapter body defines an annular U-shaped groove in which an O-ring is seated.

14. The adapter kit of claim 13, wherein the groove is located between the first end of the adapter body and a first region of the adapter body, the first region configured to receive a compression fitting.

15. The adapter kit of claim 13, wherein the O-ring is configured to sealingly engage between the adapter body and an inner diameter of the threaded nipple.

16. The adapter kit of claim 10, wherein the second end of the adapter body comprises at least one rib to facilitate crimping of the tube thereto.

17. An adapter for interconnecting a tube formed of cross-linked polyethylene or chlorinated polyvinyl chloride to a threaded nipple on a valve body using a nut and a compression fitting, the adapter comprising:
an adapter body having:
a first end configured to be received in the nipple;
a second end opposite the first end and configured to couple to the tube;
a passageway extending within the adapter body from the first end to the second end; and
a cylindrical outer surface proximate the first end;
an annular recess that extends radially inward from the outer surface and is configured to receive the compression fitting; and
a groove that is located between the recess and the first end and is configured to receive an O-ring,
wherein the recess has a rectangular cross-sectional shape and the threaded nipple is configured to overlie the recess when assembled such that a portion of the compression fitting is trapped between the threaded nipple and the adapter.

18. The adapter of claim 17, wherein the adapter body is rigid and comprises a third end configured to couple to a second tube, and wherein the passageway extends to the third end.

19. The adapter of claim 17, wherein the second end of the adapter body comprises a structure to facilitate crimping of the tube thereto.

20. The adapter of claim 17, wherein the outer surface has a second groove between the recess and the first end, the second groove configured to receive a second O-ring.

* * * * *